No. 778,693. PATENTED DEC. 27, 1904.
E. W. MÜLLER.
ELECTRICAL OUTLET BOX.
APPLICATION FILED APR. 23, 1903.
2 SHEETS—SHEET 1.
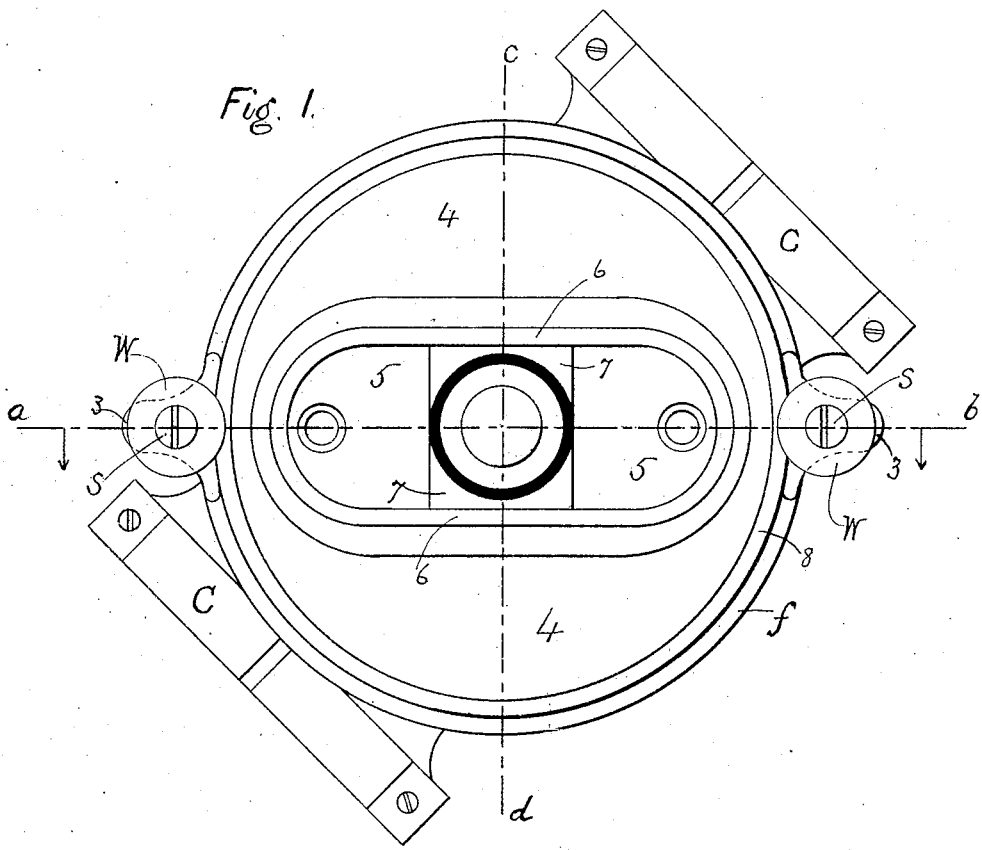
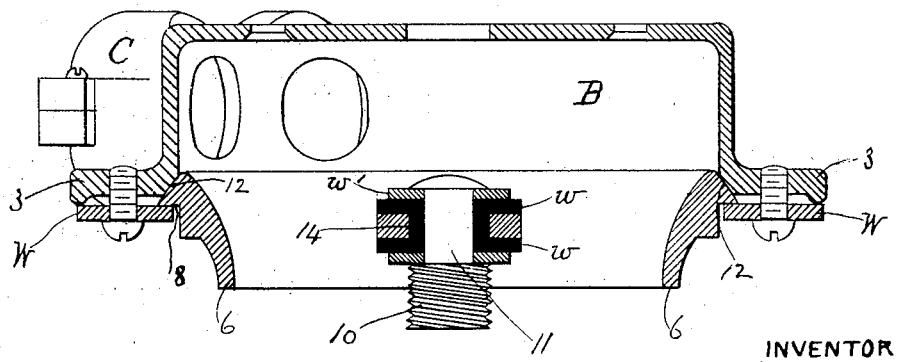
WITNESSES
F. W. Wright.
E. W. Collins
INVENTOR
Ernest W. Müller
BY
Howson and Howson
HIS ATTORNEYS

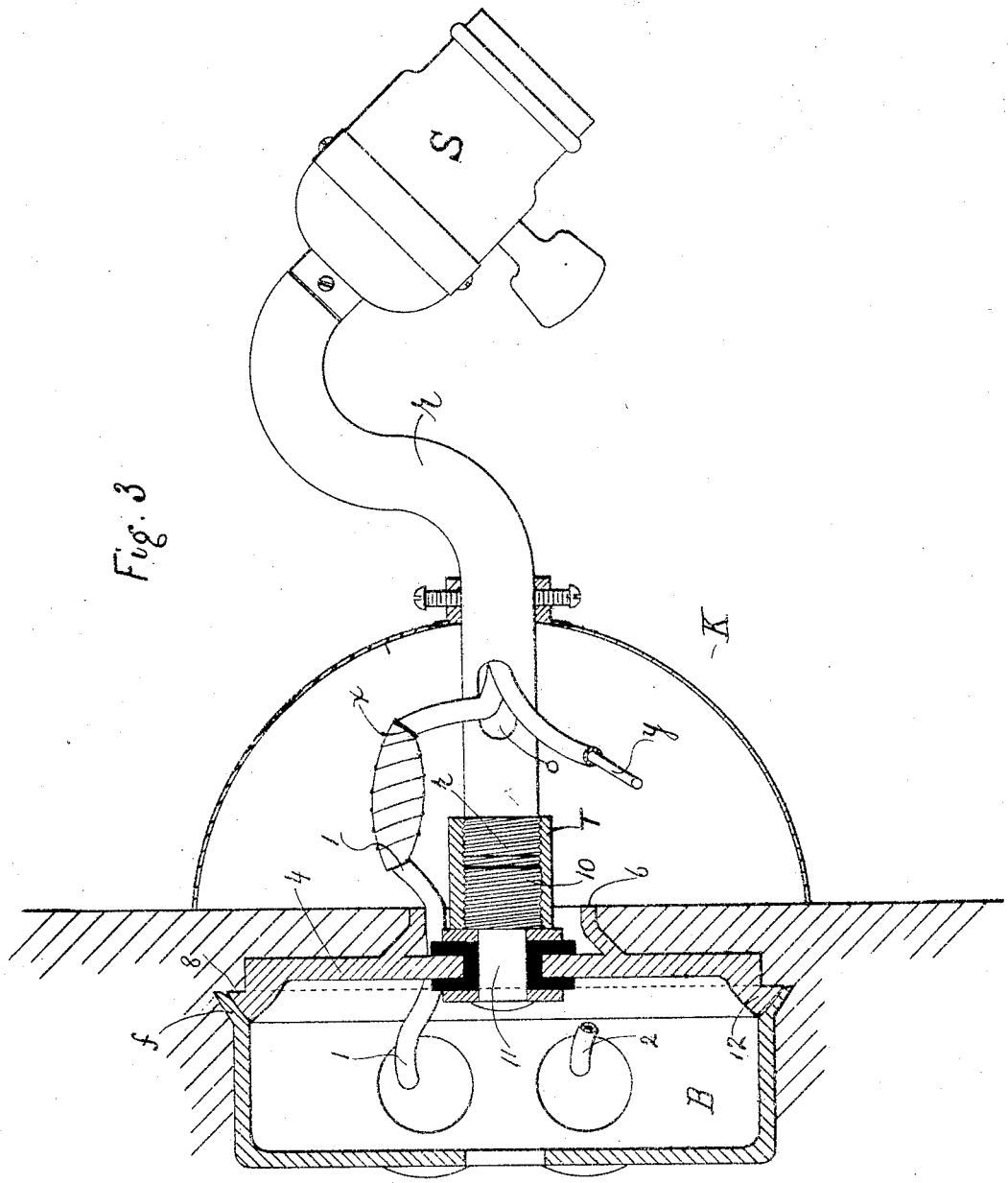

No. 778,693.                              Patented December 27, 1904.

UNITED STATES PATENT OFFICE.

ERNEST W. MÜLLER, OF BROOKLYN, NEW YORK, ASSIGNOR TO HUBERT KRANTZ, OF BROOKLYN, NEW YORK.

ELECTRICAL OUTLET-BOX.

SPECIFICATION forming part of Letters Patent No. 778,693, dated December 27, 1904.

Application filed April 23, 1903. Serial No. 154,013.

*To all whom it may concern:*

Be it known that I, ERNEST W. MÜLLER, a citizen of the United States of America, residing in the borough of Brooklyn, in the county of Kings, State of New York, have invented an Electrical Outlet-Box, of which the following is a specification.

This invention relates to outlet-boxes for electric wiring, and has for its object to provide an improved cover for said boxes provided with means for rigidly supporting and carrying a lamp-bracket or the like.

In the accompanying drawings, Figure 1 is a face view of my outlet-box and cover. Fig. 2 is a section on line $a\,b$, Fig. 1; and Fig. 3 is a section on line $c\,d$, Fig. 1, with a wall-bracket in position.

B is an outlet-box, which in the present case is shown as circular with a flaring edge $f$. The box is secured in position in the ordinary manner in the wall or ceiling, and the electric wires 1 2 are brought into the interior of the box through couplings C C, which secure the box and the conduit-pipes together. At various places along the flared edge lugs 3 are formed, and these lugs are tapped.

The cover 4 is formed disk-like with a beveled rim 12, adapted to fit tightly into the flared rim $f$ of the box. An elongated central opening 5 is formed in the cover, with a raised flange 6 around the opening and projecting outwardly. A bridge 7, of metal, is formed across this opening, dividing it in two. The outer rim of the cover is recessed to form a circular flange 8 around its periphery. To secure the cover in place on the box, the beveled rim of the cover is fitted into the flared rim of the box, and washers W, secured by screws $s$ to the lugs 3, securely hold the cover in place by bearing on the recessed flange 8 of the cover. In the metal bridge 7 I secure an insulated threaded nipple 10 by any suitable means. I have shown the nipple as having an extending shank 11, passing through an opening in the bridge part, insulated from it by insulating-washers $w\,w$, and a bushing 14, riveted at its end against a metal washer $w'$.

In Fig. 3 the plaster is seen to surround the box, extending up to the plane of the outer edge of the flange 6. The wires 1 and 2 are passed through the opening and are thus in position for whatever service may be required of them, while the screw-nipple can readily be gotten at to attach a bracket or the like.

In Fig. 3, S is a socket secured to a tube $r$, having a threaded end and an opening $o$ in its wall near its base for the two wires $x\,y$, leading to the lamp-terminals in the socket. An internally-threaded bushing T is screwed onto the nipple 10 and the end of the tube $r$, thus serving to secure the bracket to the outlet-box. A canopy K of usual construction serves to hide the connected ends of the wires 1 $x$ and 2 $y$ and also the opening 5 of the box.

I claim as my invention—

1. An outlet-box having a flaring rim, a cover with beveled edge to fit therein and means for carrying a bracket on said cover, substantially as described.

2. An outlet-box having a flaring rim, a beveled cover to fit therein and a nipple secured to said cover and insulation between the nipple and cover, substantially as described.

3. An outlet-box having a circular flaring mouth, a circular cover, having a beveled rim and adapted to fit into said mouth and a threaded nipple secured to said cover and insulated therefrom, substantially as described.

4. An outlet-box having a flaring mouth, a cover having a beveled rim fitting therein, lugs on the box and a screw and washer secured therein, said washer overlapping said cover to hold it in place and an insulated nipple carried by said cover, substantially as described.

In testimony whereof I have signed my name to this specification in the presence of two subscribing witnesses.

ERNEST W. MÜLLER.

Witnesses:
 HAYWOOD PARKER,
 LOUIS M. BOURNE.